US012553540B2

(12) United States Patent
Scales

(10) Patent No.: US 12,553,540 B2
(45) Date of Patent: Feb. 17, 2026

(54) REINFORCED CONCRETE PROTECTIVE COVER FOR CIRCUMFERENTIAL SURROUND OF PIPELINES AND METHODS

(71) Applicant: SYNTHETEX, LLC, Peachtree Corners, GA (US)

(72) Inventor: John M. Scales, Peachtree Corners, GA (US)

(73) Assignee: SYNTHETEX, LLC, Peachtree Corners, GA (US)

( * ) Notice: Subject to any disclaimer, the term of this patent is extended or adjusted under 35 U.S.C. 154(b) by 173 days.

(21) Appl. No.: 18/557,447

(22) PCT Filed: Apr. 25, 2022

(86) PCT No.: PCT/US2022/026168
§ 371 (c)(1),
(2) Date: Oct. 26, 2023

(87) PCT Pub. No.: WO2022/232040
PCT Pub. Date: Nov. 3, 2022

(65) Prior Publication Data
US 2024/0218942 A1    Jul. 4, 2024

Related U.S. Application Data

(60) Provisional application No. 63/179,649, filed on Apr. 26, 2021.

(51) Int. Cl.
*F16L 1/06*  (2006.01)
*F16L 1/11*  (2006.01)
*F16L 57/00* (2006.01)

(52) U.S. Cl.
CPC . *F16L 1/06* (2013.01); *F16L 1/11* (2013.01); *F16L 57/00* (2013.01)

(58) Field of Classification Search
CPC ..... F16L 1/06; F16L 1/11; F16L 1/123; F16L 57/00
(Continued)

(56) References Cited

U.S. PATENT DOCUMENTS 687,389 A * 11/1901 Wilhelmi ................. H02G 3/26
                                                    405/172
2,007,969 A *  7/1935 Grodsky .................. E02B 13/00
                                                    138/DIG. 6
(Continued)

FOREIGN PATENT DOCUMENTS

CA        2726392 A1    6/2012
CN    113700934 A  *  11/2021  .............. F16L 1/028
(Continued)

OTHER PUBLICATIONS

International Search Report and Written Opinion issued on Jul. 22, 2022, in corresponding International Application No. PCT/US2022/026168, 9 pages.

*Primary Examiner* — Frederick L Lagman
(74) *Attorney, Agent, or Firm* — Maier & Maier, PLLC

(57) ABSTRACT

A formwork for a circumferential jacketing surround of a pipe with an envelope having opposing top and bottom layers interconnected by opposing end panels and opposing first and second side edges defining open ends configured with opposing mating connectors for joining the first side and the second side edges together for receiving in situ a curable material for a circumferential jacketing surround of the pipe, with interior linkages for holding the top and bottom layer in spaced-apart relation upon filling the envelope therewith, and further including longitudinal and transverse cables therein for reinforcement of the protective surround cover. A method for jacketing a pipeline with a
(Continued)

circumferential reinforced surround and a method for forming a jacketing surround for a pipeline are disclosed.

18 Claims, 5 Drawing Sheets

(58) Field of Classification Search
USPC .................................... 405/157, 172, 184.4
See application file for complete search history.

(56) References Cited

U.S. PATENT DOCUMENTS

| | | | | |
|---|---|---|---|---|
| 3,675,432 | A * | 7/1972 | Keene | F16L 59/12 |
| | | | | 405/157 |
| 3,779,027 | A * | 12/1973 | Murphy | F16L 1/123 |
| | | | | 141/10 |
| 4,102,137 | A * | 7/1978 | Porraz | E02B 3/127 |
| | | | | 405/172 |
| 4,477,206 | A * | 10/1984 | Papetti | F16L 1/24 |
| | | | | 405/172 |
| 4,909,669 | A * | 3/1990 | Baker | F16L 1/123 |
| | | | | 138/172 |
| 5,052,859 | A * | 10/1991 | Miller | E02B 3/12 |
| | | | | 405/157 |
| 5,099,889 | A | 3/1992 | Ratzlaff | |
| 5,385,430 | A * | 1/1995 | Connors | F16L 1/06 |
| | | | | 405/172 |
| 5,490,742 | A * | 2/1996 | Cronk | F16L 57/00 |
| | | | | 405/157 |
| 7,344,338 | B2 * | 3/2008 | Willis | F16L 1/028 |
| | | | | 405/172 |
| 7,862,256 | B2 * | 1/2011 | Sprague | F16L 1/24 |
| | | | | 405/172 |
| 8,262,320 | B2 * | 9/2012 | Gunn | F16L 1/24 |
| | | | | 383/24 |
| 8,651,149 | B2 * | 2/2014 | Katona | F16L 57/02 |
| | | | | 138/172 |
| 2004/0101368 | A1 | 5/2004 | Daigle | |
| 2006/0198705 | A1 * | 9/2006 | Willis | F16L 1/06 |
| | | | | 405/172 |
| 2010/0189514 | A1 * | 7/2010 | Gunn | F16L 1/24 |
| | | | | 405/172 |
| 2013/0315672 | A1 * | 11/2013 | Pajak | F16L 1/028 |
| | | | | 405/157 |
| 2021/0222803 | A1 * | 7/2021 | Saukkola | F16L 57/00 |

FOREIGN PATENT DOCUMENTS

| | | | | |
|---|---|---|---|---|
| GB | 2131909 A * | 6/1984 | | F16L 1/123 |
| KR | 101837115 B1 * | 3/2018 | | F16L 1/123 |

* cited by examiner

REINFORCED CONCRETE PROTECTIVE COVER FOR CIRCUMFERENTIAL SURROUND OF PIPELINES AND METHODS

FIELD

The present invention relates to protection apparatus and methods for covering and shielding portions of pipelines to resist environmental damage from rock falls, landslides, and weather at above ground ravine and waterway crossing exposures of the pipeline. More particularly, the present invention is directed to an in situ installed formwork envelope and curable flowable cementitious material for forming an enclosing circumferential surround jacket for pipeline resistance to damage from ambient environmental conditions of rock falls, landsides, and weather at above ground ravine and waterway crossing exposures of the pipeline.

BACKGROUND

Fluidal commodity products, particularly oil and gas petroleum products, often transport over long distances by pipeline. The pipelines use pumping stations that cause the fluidal products to flow through the pipeline between, for example, a source supply facility and a use storage facility, for product processing and use and/or distribution of such products to end users.

Pipelines typically extend long distances and routinely are buried within a pipeline right-of-way. Buried pipelines are thereby protected from damage from environmental conditions by the over-burden ground. Often however the pipelines extend outwardly from the ground for a distance before re-entering below grade. For example, pipelines protrude from the ground for extending over rivers or ravines. Also, the pipeline may be exposed above ground for connection to source or use storage facilities.

The river or ravine crossings expose the pipeline to risk of damage from rock falls or landslides. Efforts are made however to protect the pipeline. Frames are placed above and around the pipeline to shield the pipeline. Frames may include backfill materials. While these frames provide some reinforced protection of the pipeline proximate the ground entrance, the frames however are not entirely secure for protection of the portions of the pipeline that are longitudinally outward of the frame. The frames further incur costs to install and maintain.

Accordingly, there is a need in the art for an improved protective structure for shielding pipelines exposed at river and ravine crossings from damage caused by rock falls and landslides. It is to such that the present invention is directed.

SUMMARY

The present invention meets the need in the art for an improved protective structure for shielding pipelines exposed at river and ravine crossings. The protective structure is a formwork for a circumferential jacketing surround of a pipe, comprising an envelope having opposing top and bottom layers interconnected by opposing end panels and opposing first and second side edges defining open ends that are configured with opposing mating connectors for joining the first side and the second side edges together. The formwork wraps circumferentially around a pipe, whereby the opposing first and second side edges connect together with the mating connectors and the fluidal curable material received in situ into the envelope for curing the formwork as a circumferential jacketing surround of the pipeline.

The formwork further comprises a plurality of a set of interior linkages between the top layer and the bottom layer, for holding the top and bottom layer in spaced-apart relation upon filling the envelope with the fluidal curable material.

The formwork, wherein said linkages in each set cross medial the top layer and the bottom layer as a crossing support; and further comprising a plurality of circumferential cables extending between the crossing support and the opposing top layer of the envelope from the opposing first side edge to the second side edge sides. The formwork further comprising a plurality of cable clamps, each for securing opposing ends of a respective one of the circumferential cables prior to joining the first and second side edges. The formwork further comprising a plurality of longitudinal cables extending between the circumferential cables and the top layer between the opposing first and second sides.

The formwork, wherein said opposing top and bottom layers of said envelope each formed of a woven sheet. The formwork, wherein the each of said interior linkages in each of the plurality of sets of interior linkages are a pair of interwoven cords. The formwork, wherein each said pair of cords are interwoven in spaced-apart relation in the woven sheet. The formwork, wherein said pair of cords are spaced at least one dent of a fabric weaving loom.

The formwork, wherein said opposing ends formed of fabric sheets.

The formwork, wherein said mating connectors comprises a slide fastener.

The formwork, wherein said mating connector comprises elongated strips of hook-and-loop fabric fasteners.

The formwork, further comprising a plurality of pull cords extending through the envelope between the opposing sides, said pull cords for attaching at one end to a respective cable and removed by pulling thereof from the opposing side for installing said respective cable between.

The formwork, wherein said respective cable comprises one of said circumferential cables.

The formwork, further comprising a fill port in the envelope for receiving fluidal curable material into the envelope.

In another aspect, the present invention provides a formwork for a circumferential jacketing surround of a pipe, comprising an envelope having opposing top and bottom layers interconnected by opposing end panels and opposing first and second side edges defining open ends that are configured with opposing mating connectors for joining the first side and the second side edges together. A plurality of a set of interior linkages between the top layer and the bottom layer, said linkages in each set crossing medial the top layer and the bottom layer as a crossing support. A plurality of circumferential cables extending between the crossing support and the opposing top layer of the envelope from the opposing first side edge to the second side edge sides. A plurality of cable clamps, each for securing opposing ends of a respective one of the circumferential cables. A plurality of longitudinal cables extending between the circumferential cables and the top layer between the opposing first and second sides. The formwork for wrapping circumferentially around a pipe, whereby the opposing ends of each respective one of the circumferential cables being clamped together and the opposing first and second side edges connect together with the mating connectors, with the fluidal curable material received into the envelope for curing the formwork as a circumferential jacketing surround of the pipeline.

The formwork, wherein said opposing top and bottom layers of said envelope each formed of a woven sheet; and further, wherein the each of said interior linkages in each of the plurality of sets of interior linkages are a pair of interwoven cords; and further wherein each said pair of cords are interwoven in spaced-apart relation in the woven sheet. The formwork, wherein said pair of cords are spaced at least one dent of a fabric weaving loom.

The formwork, wherein said opposing ends formed of fabric sheets.

The formwork, wherein said mating connectors comprises a slide fastener.

The formwork, wherein said mating connector comprises elongated strips of hook-and-loop fabric fasteners.

The formwork, further comprising a plurality of pull cords extending through the envelope between the opposing sides, said pull cords for attaching at one end to a respective cable and removed by pulling thereof from the opposing side for installing said respective cable between.

The formwork, further comprising a fill port in the envelope for receiving fluidal curable material into the envelope.

In yet another aspect, the present invention provides a method for jacketing a pipeline with a circumferential surround, comprising the steps of:
 (a) wrapping an envelope around a section of a pipe, said envelope having opposing top and bottom layers interconnected by opposing end panels and opposing first and second side edges that are configured with opposing mating connectors for joining the first side and the second side together;
 (b) joining the first and second side edges; and
 (c) filling an interior cavity of the envelope with a curable fluidable material, whereby the formwork wrapped circumferentially around a pipe and closed by connecting together the opposing first and second side edges with the mating connectors, being filled with the fluidal curable material received into the envelope for curing as a circumferential jacketing surround of the pipeline.

The method of jacketing, further comprising the step of defining a plurality of a series of spaced-apart crossing supports medial the opposing top and bottom layers, each one of said series of spaced-apart crossing supports between the opposing end panels and said plurality of said series spaced-apart between the first and second side edges.

The method of jacketing, further comprising the step of positioning in a respective one series of the plurality of series of crossing supports a respective one of a plurality of circumferential cables between the crossing support and the top layer.

The method of jacketing, further comprising the step of connecting opposing ends of each respective one of the circumferential cables with a respective one of a plurality of cable clamps before joining the first and second side edges.

The method of jacketing, further comprising the step of positioning a plurality of longitudinal cables extending transverse to the circumferential cables between opposing end panels.

The method of jacketing, further comprising the step of positioning a plurality of longitudinal cables extending transverse to the circumferential cables between opposing end panels.

The method of jacketing, further comprising the step of positioning a plurality of a set of interior linkages between the top layer and the bottom layer, said interior linkages defining the crossing supports by crossing medial the top layer and the bottom layer.

The method of jacketing, wherein the top and bottom layers are woven fabric sheets and further comprising interweaving the plurality of sets of interior linkages with at least a first cord and a second cord woven in alternating respective opposing top sheet and bottom sheet for a respective predetermined length, whereby said interior linkage comprises a portion of the cord transition between the top and bottom layer and said respective portions defining the crossing support.

The method of jacketing, wherein the curable fluidable material fills the envelope through a fill port.

In yet another aspect, the present invention provides a method of forming a jacketing surround for a pipeline, comprising the steps of:
 (a) weaving a formwork envelope having opposing top and bottom layers and including interweaving of:
  a plurality of sets of interior linkages, each set having at least a first cord and a second cord woven in alternating respective opposing top sheet and bottom sheet for a respective predetermined length, whereby said interior linkage comprises a portion of the cord transition between the top and bottom layer and said respective portions defining a respective one of a plurality of crossing supports;
  a plurality of spaced-apart longitudinal pull cords in said to sheet; and a plurality of spaced-apart transverse pull cords in said top sheet;
 (b) attaching opposing mating connectors to opposing first and second side edges for joining the first side and the second side together;
 (c) attaching each respective longitudinal pull cord to a circumferential cable;
 (d) pulling each respective longitudinal pull cord from the envelope to position the circumferential cable between the crossing supports and the top layer;
 (e) attaching each respective transverse pull cord to a longitudinal cable;
 (f) pulling each respective transverse pull cord from the envelope to position the longitudinal cable between the respective circumferential cable and the top layer,
 whereby the formwork envelope being wrapped circumferentially around a pipe, the opposing ends of each respective one of the circumferential cables clamped together, and the opposing first and second side edges connected together with the mating connectors, filling the formwork envelope with a fluidal curable material for curing the formwork envelope as a circumferential jacketing surround of the pipeline.

Objects, advantages, and features of the present invention will be readily apparent upon a reading of the following detailed description in conjunction with the drawings.

DETAILED DESCRIPTION

Figure 1:
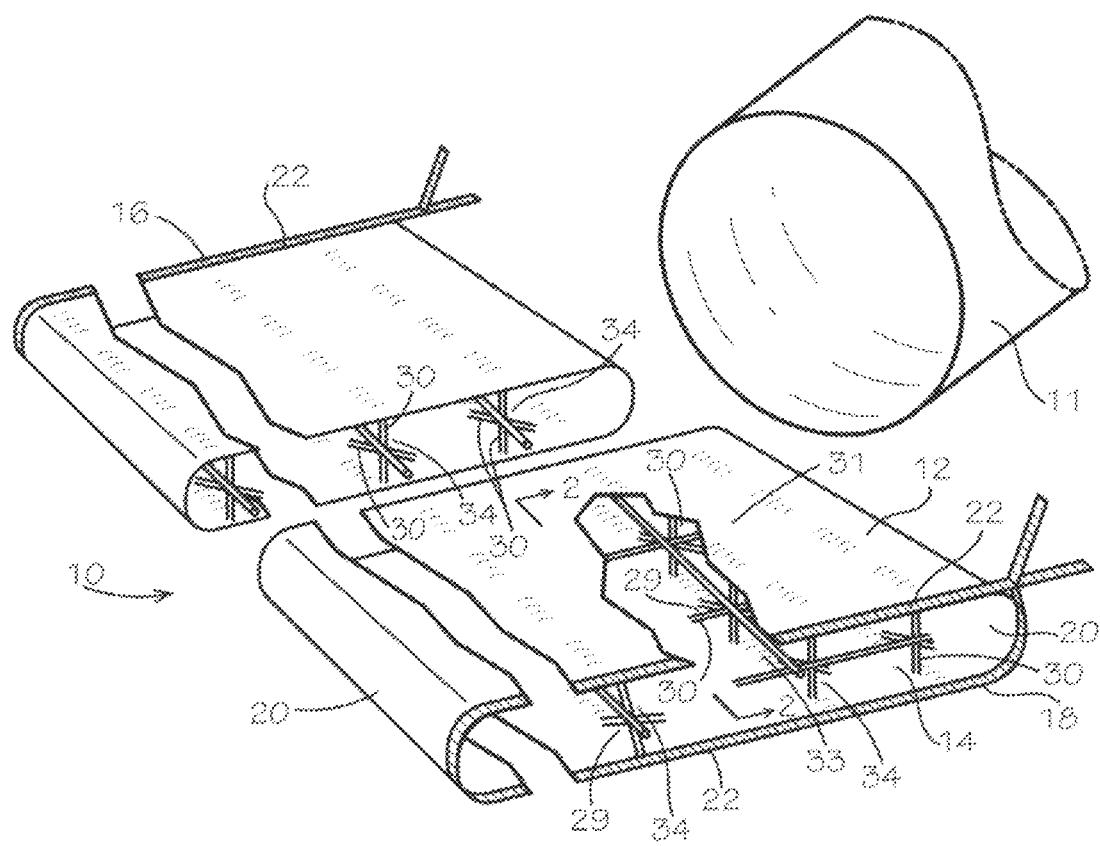
FIG. 1 illustrates in perspective view a formwork for wrapping as a protective jacket around a pipe of a pipeline.

With reference to the drawings, in which like parts have like reference numerals, the present invention provides an improved protective structure for shielding pipelines exposed at river and ravine crossings. The protective structure provides a formwork for a circumferential jacketing surround of a pipe, with the formwork comprising an envelope having opposing top and bottom layers interconnected by opposing end panels and opposing first and second side edges defining open ends that are configured with opposing mating connectors for joining the first side and the second side edges together. The formwork wraps circumferentially around a pipe, whereby the opposing first and second side edges connect together with the mating connectors and the fluidal curable material received in situ into the envelope for curing the formwork as a circumferential jacketing surround of the pipeline.

The formwork further comprises a plurality of a set of interior linkages between the top layer and the bottom layer, for holding the top and bottom layer in spaced-apart relation upon filling the envelope with the fluidal curable material.

The formwork, wherein said linkages in each set cross medial the top layer and the bottom layer as a crossing support; and further comprising a plurality of circumferential cables extending between the crossing support and the opposing top layer of the envelope from the opposing first side edge to the second side edge sides. The formwork further comprising a plurality of cable clamps, each for securing opposing ends of a respective one of the circumferential cables prior to joining the first and second side edges. The formwork further comprising a plurality of longitudinal cables extending between the circumferential cables and the top layer between the opposing first and second sides.

The formwork, wherein said opposing top and bottom layers of said envelope each formed of a woven sheet. The formwork, wherein the each of said interior linkages in each of the plurality of sets of interior linkages are a pair of interwoven cords. The formwork, wherein each said pair of cords are interwoven in spaced-apart relation in the woven sheet. The formwork, wherein said pair of cords are spaced at least one dent of a fabric weaving loom.

The formwork, wherein said opposing ends formed of fabric sheets.

The formwork, wherein the mating connectors comprises a slide fastener, elongated strips of hook-and-loop fabric fasteners, mating clips, snaps, or other opposing material connectors.

The formwork, further comprising a plurality of pull cords extending through the envelope between the opposing sides, said pull cords for attaching at one end to a respective cable and removed by pulling thereof from the opposing side for installing said respective cable between.

The formwork, wherein said respective cable comprises one of said circumferential cables.

The formwork, further comprising a fill port in the envelope for receiving fluidal curable material into the envelope.

In another aspect, the present invention provides a method of securing a pipeline exposed at ravine and river crossings from rock fall and landslide damage by jacketing the pipe with a circumferential surround having an in situ curable material therein, comprising the steps of:

(a) wrapping an envelope around a section of a pipe, said envelope having opposing top and bottom layers interconnected by opposing end panels and opposing first and second side edges that are configured with opposing mating connectors for joining the first side and the second side together;

(b) joining the first and second side edges; and (c) filling an interior cavity of the envelope with a curable fluidable material, whereby the formwork wrapped circumferentially around a pipe and closed by connecting together the opposing first and second side edges with the mating connectors, being filled with the fluidal curable material received into the envelope for curing as a circumferential jacketing surround of the pipeline.

In another aspect, the present invention provides a method of forming a woven formwork for a jacketing surround for a pipeline, comprises the steps of:

(a) weaving a formwork envelope having opposing top and bottom layers and including interweaving of:

a plurality of sets of interior linkages, each set having at least a first cord and a second cord woven in alternating respective opposing top sheet and bottom sheet for a respective predetermined length, whereby said interior linkage comprises a portion of the cord transition between the top and bottom layer and said respective portions defining a respective one of a plurality of crossing supports;

a plurality of spaced-apart longitudinal pull cords in said to sheet; and a plurality of spaced-apart transverse pull cords in said top sheet;

(b) attaching opposing mating connectors to opposing first and second side edges for joining the first side and the second side together;

(c) attaching each respective longitudinal pull cord to a circumferential cable;

(d) pulling each respective longitudinal pull cord from the envelope to position the circumferential cable between the crossing supports and the top layer;

(e) attaching each respective transverse pull cord to a longitudinal cable;

(f) pulling each respective transverse pull cord from the envelope to position the longitudinal cable between the respective circumferential cable and the top layer.

The formed formwork envelope thereafter being wrapped circumferentially around a pipe at an exposed ravine or river crossing, the opposing ends of each respective one of the circumferential cables clamped together, and the opposing first and second side edges connected together with the mating connectors, the formwork envelope being in situ filled with a fluidal curable material for curing as a circumferential jacketing surround of the pipeline.

General Fabric Construction

Figure 1A:
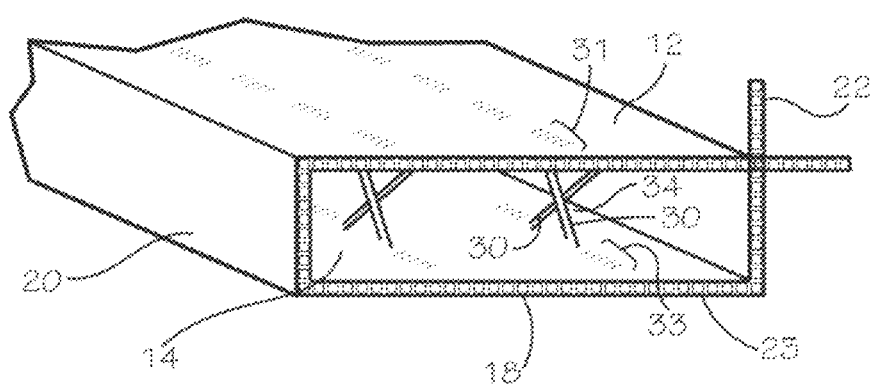
FIG. 1A illustrates in perspective view an end of the formwork illustrated in FIG. 1.
Figure 6:
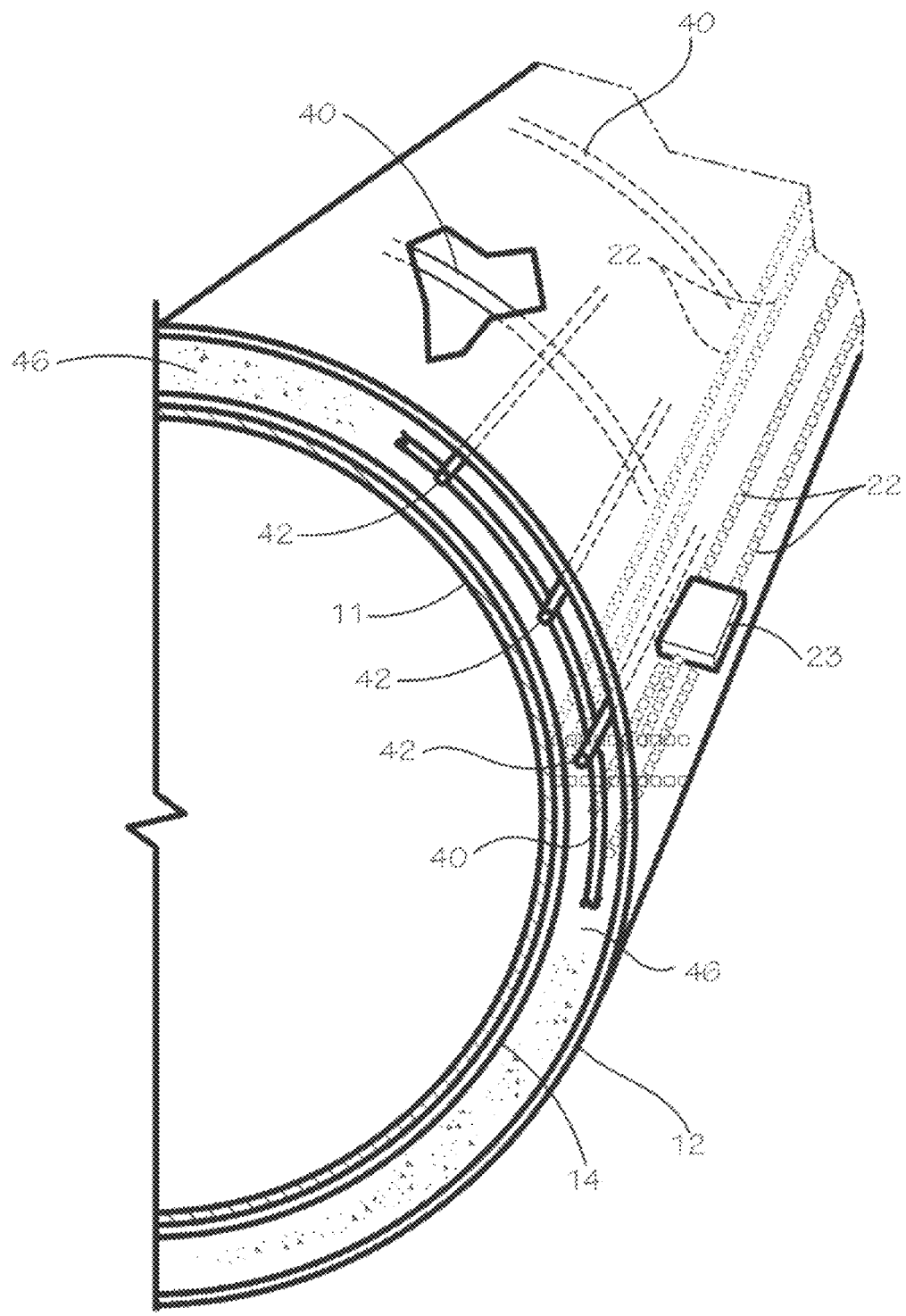
FIG. 6 illustrates in perspective view a cut-away portion of the pipe jacketed by the formwork that wraps around the circumference of the pipe.

With reference to the drawings, FIG. 1 illustrates in perspective view a formwork 10 for wrapping as a protective jacket around a pipe 11 of a pipeline. The formwork 10 comprises a woven top layer 12 and an opposing woven bottom layer 14, with opposing sides 16, 18 and opposing longitudinal ends 20. In the illustrated embodiment, the ends 20 are defined by baffle fabric members added during assembly discussed below to close the formwork envelope and maintain a predetermined spacing between the layers 12, 14. During installation of the formwork 10 wrapping around a pipe, one end 20 is positioned on a first portion of the pipe while the opposing end 20 is positioned on an up-flow portion relative to the pipe. One layer of the formwork defines an outer or exterior layer when wrapped around the pipe 11 while the other layer defines an inner layer adjacent an exterior surface of the pipe. The open sides 16, 18 have closure members 22. The closure members are matingly engageable connector members for closing the respective opposing sides 16, 18 when the formwork wraps around the pipe 11. In the illustrated embodiment, the closure members 22 are elongated slide fasteners having matingly engageable tracks joined by a movable fastener slide 23 (shown in FIG. 6). FIG. 1A illustrates in perspective view the side 18 of the formwork illustrated in FIG. 1, with tracks of the slide fastener type closure member 22. The opposing side 16 includes the matingly engageable opposing tracks of the slide fastener type closure member 22. In an alternate embodiment, the closure members 22 are elongated strips of hook-and-look fasteners, which strips attach in opposing relation to the fabric for joining the open ends 16, 18 when the formwork is wrapped around the circumference of the pipe 11. The closure members 22 connect together to join the opposing sides 16, 18 for the formwork 10 to jacket the pipe 11 and define an interior cavity between the layers 12, 14 for receiving in situ a curable flowable material therein.

The formwork fabric consists of the double-layer woven fabric layers 12, 14 joined together by interior spaced, sets 29 of interwoven cords 30 of uniform length to form a concrete pipeline cover of a selected specified average thickness. The thickness of the cavity defined by the opposing layers 12, 14 is based on engineering design criteria for force and impact resistance to protect the jacketed pipe. The cords 30 are intermittently interwoven between the two layers 12, 14 of fabric, in multiple spaced parallel sets, so that a group of two (2) or more cords, of each set, weave together 31 into the top layer and a group of two (2) or more cords, of each set, weave together 33 in the bottom layer. There is a narrow lateral distance or gap 32 between the grouped top cords and the bottom cords in each set. The gap 32 may be equal to one (1) or more dents in the weaving machines (loom).

Figure 2:
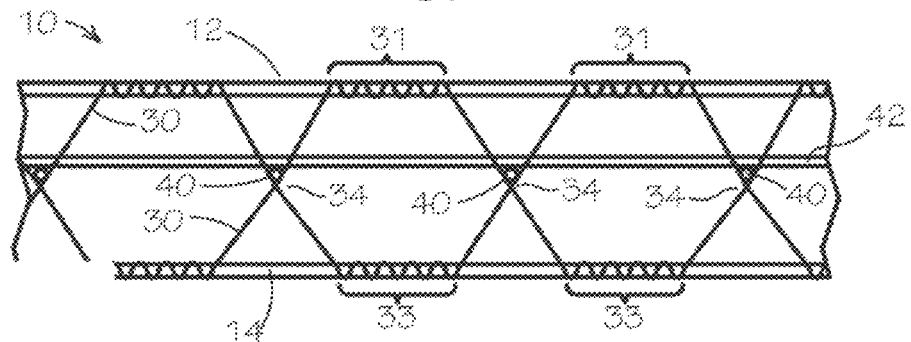
FIG. 2 illustrates a side cross-sectional view of the formwork illustrated in FIG. 1.

FIG. 2 illustrates a side cross-sectional view of the formwork 10 illustrated in FIG. 1. At designated spaced-apart intervals, the cords 30 in the top layer 12 and bottom layer 14 of fabric cross to define the plurality of crossing supports 34. The cords 30 in the top layer and bottom layer disengage weaving into the respective fabric layer and advance a controlled distance, contained between the top and bottom layers of the fabric, before re-engaging weaving into the opposing fabric with the previously top cords engaging the bottom fabric layer and the previously bottom cords engaging the top fabric layer. The disengagement of the cords in a first layer, advancement, and reengagement in the opposing second layer forms a crisscross or crossing support 34 as the two cords exchange places for weaving into the respective layer. The weaving thus forms multiple cord crisscross 34 between the two opposing layers of fabric. This procedure continues with the exchange and crisscross of top and bottom cords. The crossing supports 34 support respective circumferential cables 40 and longitudinal cables 42, as discussed below.

Figure 1B:
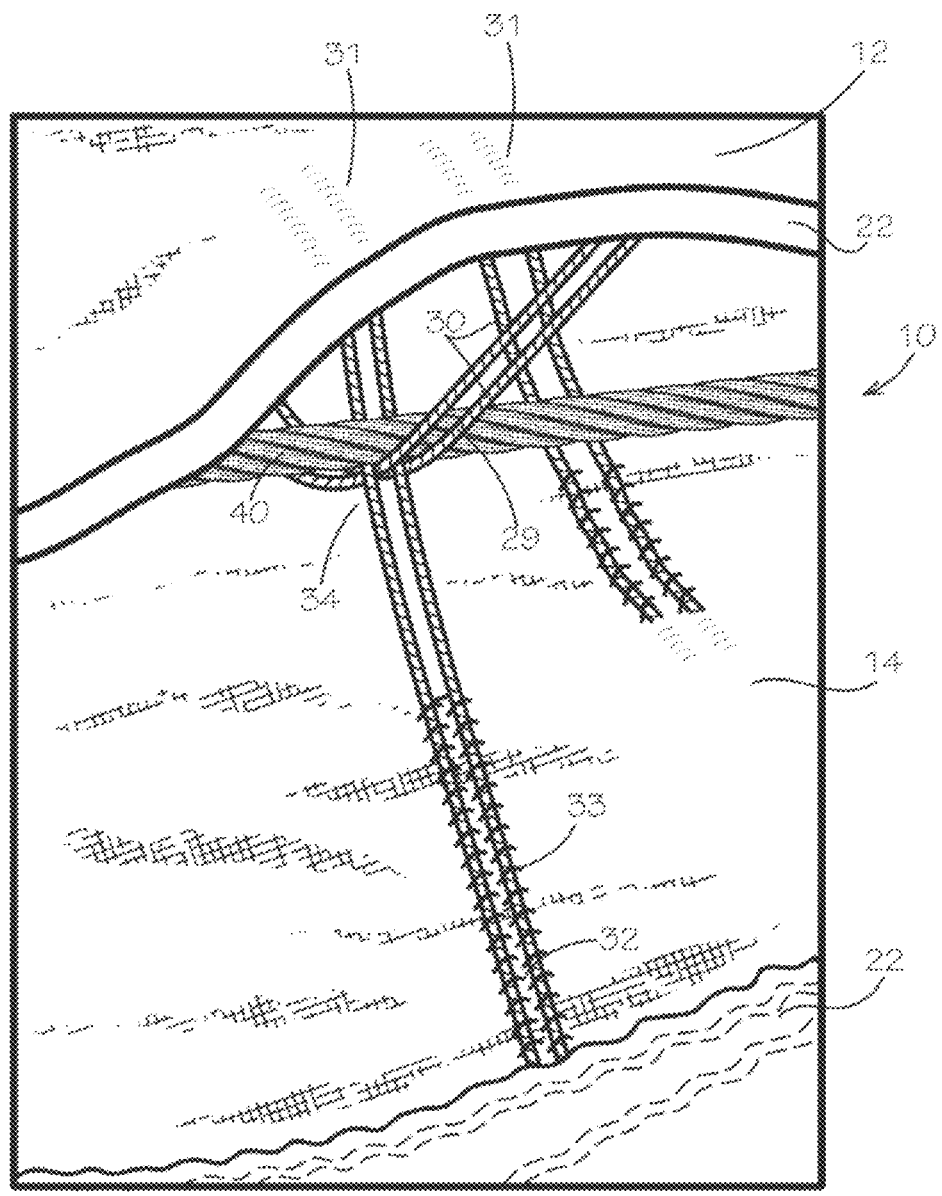
FIG. 1B illustrates in perspective view an open side of the formwork illustrated in FIG. 1.

FIG. 1B illustrates in perspective view the open side 18 of the formwork illustrated in FIG. 1. The cords 30 in the top layer 12 and bottom layer 14 of the fabric cross to define the plurality of crossing supports 34. The cords 30 in the top layer and bottom layer disengage weaving into the respective fabric layer and advance a controlled distance, contained between the top and bottom layers 12, 14 of the fabric, before re-engaging weaving into the respective opposing fabric. Thus, the previously top cords 30 cross between the top and bottom fabric layers 12, 14 and weavingly engage the bottom fabric layer. The previously bottom cords 30 cross from the bottom fabric layer 14 to the top fabric layer 12 and weavingly engage the top fabric layer. The respective crossings of the opposing cords 30 define the crisscross or crossing supports 34. The crossing supports 34 support respective circumferential cables 40 and longitudinal cables 42. The circumferential cables 40 sit on the crossing supports 34. The longitudinal cables 42 extend through the gaps 32 of the opposing sets of cords 30 and sit on the circumferential cables 40 supported by the crossing supports 34 between the top and bottom layers 12, 14 of the formwork 10.

Cable Pull Cords

Weft direction pull cords install between the top and bottom layers 12, 14 of fabric in such a manner as to "float" between the top and bottom layers, at designated centers, without engaging the woven top or bottom fabric layers. (The weft (lateral) direction in weaving, denotes the direction of the width of the woven fabric.)

Warp direction pull cords install between the groups of cords in a set and the top and bottom layers of fabric in such a manner as to "float" between the layers, without engaging the woven top or bottom fabric layers. Warp direction pull cords are installed in such a manner in two (2) or more sets of cords along the weft direction of the fabric. Warp pull cords are installed in such a manner as to pass over the top of the weft pull cords. (The warp (longitudinal) direction in weaving denotes the direction of the length of the woven fabric.)

Assembly Of Pipeline Cover Formwork

Cutting and Assembling the Fabric Formwork Pipeline Cover to Required Circumference and Length Dimensions The fabric formwork 10 is cut to a length required for a circumference of the pipe 11 plus a length to account for contraction of the formwork during concrete filling of the formwork.

Should the pipeline length require a formwork cover of more than one (1) width of woven fabric, adjacent panels of the double-layer fabric are separately joined, the bottom layer to bottom layer adjacent edges and the top layer to top layer adjacent edges, by means of sewing thread, glue, hook and loop fastening strips, or heat bonding, to form a multiple fabric width pipeline cover of required length.

Concrete Reinforcement

Cables 40, 42 or flexible wire, such as galvanized aircraft cable, are installed (floated) between the top and bottom layers of the formwork fabric in both the weft and work directions. The cables provide reinforcement for concrete received into the formwork 11 between the layers 12, 14, during installation of formwork to the pipe 11. The cables are held between the layers 12, 14 by the crossing supports 34. The cables are installed by first connecting the fabric's designated weft pull cords to a respective one of a plurality of specified weft direction cables or flexible wires 40, and pulling the weft pull cords outwardly from one of the open sides in such a manner as to extract the weft pulls cords from between the formwork fabric layers 12, 14 and thereby pull and install the weft direction cables 40 into the fabric formwork between the fabric layers.

Upon installation of the weft direction cables, designated warp direction cables or flexible wires 42 are connected to a respective one of the warp pull cords. The warp pull cords are then pulled out from one of the open ends of the fabric formwork 10 in such a manner as to extract the warp pull cords from between the opposing top and bottom layers 12, 14 and pullingly install the warp direction cables 42 or flexible wires into the fabric formwork, which cables 42 pass over the top of the weft direction cables 40 or flexible wires.

At the two (2) ends of the pipeline cover length, the doubleday er fabric is joined, top layer to bottom layer, by means of sewing thread, glue, hook and loop fastening strips, or heat bonding, to form a circumferential closing of each formwork end.

Or, alternatively, end fabric baffles 20 may be installed at the two (2) ends of the pipeline cover length by joining the two side edges of a baffle, with a length equal to length of the pipeline cover plus two (2) times the specified thickness of the concrete pipeline cover, one edge to the top layer and the other edge to the bottom layer of the fabric formwork 10. The baffles maintain a full concrete pipeline cover thickness along the full length of the baffle.

[Slide fasteners 22 (zippers) or hook and loop strips are installed along the length of the pipeline cover formwork to the edges of the sides 16, 18 with one side of the slide fastener to the top layer 12 of fabric and the other to the bottom layer 14 of the fabric. In an alternate embodiment, opposing hook and loop strips attach for connecting opposing portions. Should the pipeline cover formwork include end fabric baffles, the slide fasteners or hook and loop strips extend the length of the baffles. Alternate closure members include snaps, buttons and opposing slits, and other structures for joining the open sides 16, 18 during installation of the formwork 10.

Each fabric formwork pipeline cover may have one (1) or more filling ports 44 and one (1) or more venting ports (not illustrated). Filling ports 44 are designed and arranged in such a manner as to facilitate the insertion of a concrete pumping hose. Filling port constructions include flap valves, fabric or plastic tubes, flange and pipe assemblies, and other fluid communicating passages. The venting ports may be fabric or plastic tubes, flange and pipe assemblies, or other fluid communicating passages. An embodiment however may use a partially closed connection of the opposing sides 16, 18 as an alternate to a filling port by in situ insertion of a filling source hose therethrough. The filling source hose is removed upon filing the cavity with the curable flowable material and the partially closed side is closed.

Installing Fabric Formwork For Casting Concrete Pipeline Covers

Step 1. The fabric formwork pipeline cover 10 with preinstalled warp 42 and weft reinforcement cables 40 or flexible wires is wrappingly placed over the pipe 11. The opposing ends 20 are positioned relative to each other in opposing down-flow and up-flow portions of the pipe. The formwork 10 is positioned in such a manner as to have the filling and venting ports along the longitudinal top of a designated length of the pipeline.

The bottom layer of the fabric formwork defines an inside layer of the formwork 11 and the top layer of the fabric formwork defines an outside layer of the wrapping formwork.

Step 2. Connect the two (2) opposing sides of the inside layer of fabric formwork to each other, by zipping the slide fasteners or engaging the hook and loop strips from one end of the fabric formwork to the other end of the fabric formwork.

Figure 3A:
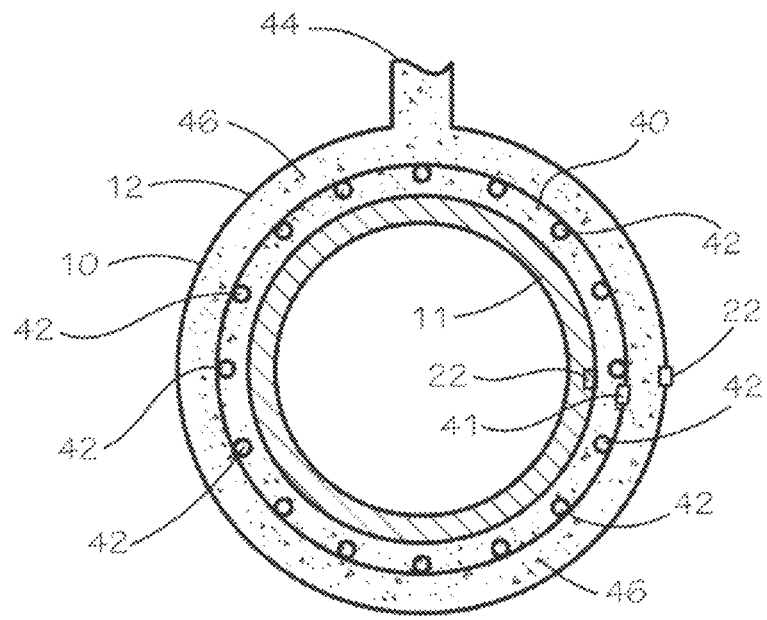
FIG. 3A illustrates a cross-sectional view of the formwork wrapped around the pipe.
Figure 3B:
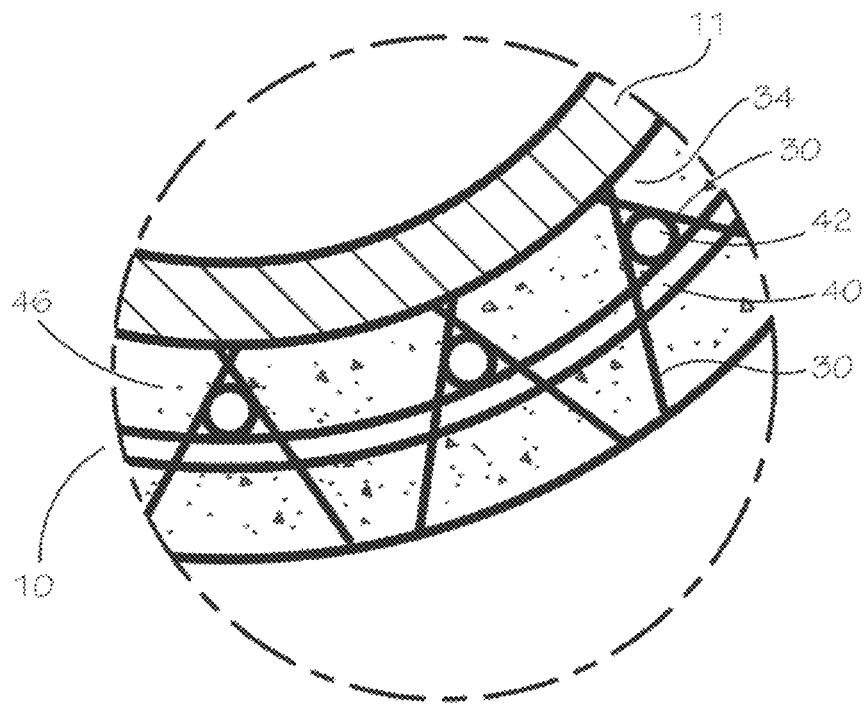
FIG. 3B illustrates a detailed view of a portion of the formwork illustrated in cross-sectional view in FIG. 3A.
Figure 3C:
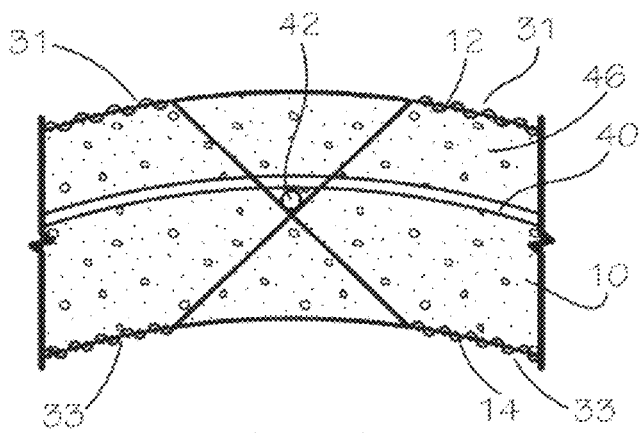
FIG. 3C illustrates another detailed of a portion of the formwork illustrated in cross-sectional view in FIG. 3B.
Figure 3D:
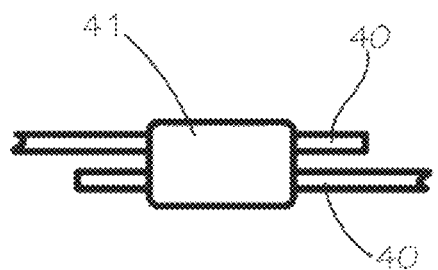
FIG. 3D illustrates a detailed view of a cable swage that secures together the opposing ends of a circumferential cable within the formwork for extending around the outer circumference of the pipe.
Figure 4:
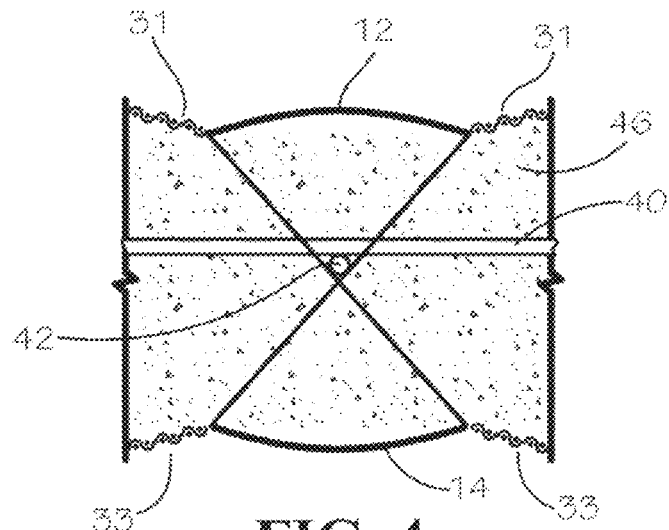
FIG. 4 illustrates a longitudinal sectional view of the formwork on an exterior surface of the pipe.
Figure 5:
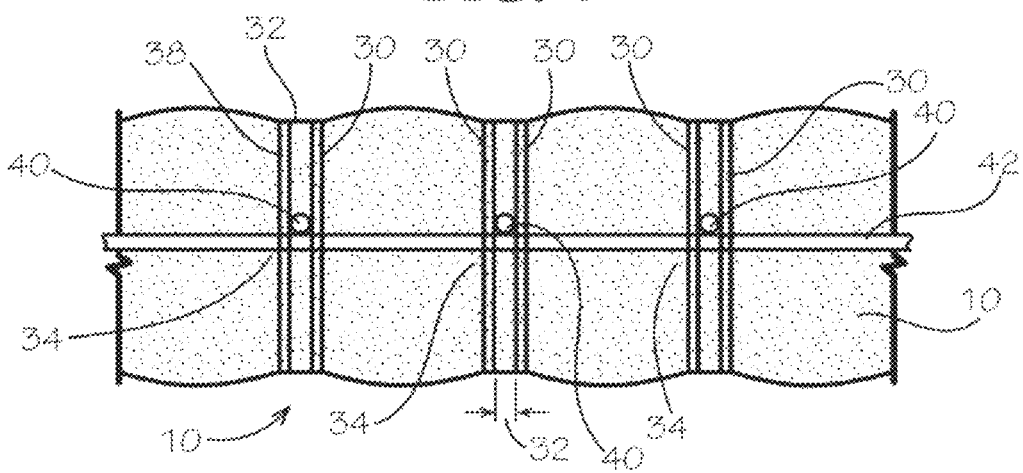
FIG. 5 illustrates lateral sectional view of the formwork on an exterior surface of the pipe.

Step 3. Connect one (1) end of each warp direction cable or flexible wire to the opposite end of the same cable or flexible wire, for example, by means of a compression swage 41 or other like cable connecting device, as shown in FIG. 3D.

Step 4. Connect the two (2) opposing sides of the outside layer of fabric formwork to each other, by zipping the slide fasteners or engaging the hook and loop strips from one end of the fabric formwork to the other end of the fabric formwork.

Step 5. Install the discharge end of a concrete pump hose through the first designated filling port, located at the opposite end of the formwork from the venting port, and pump concrete 46 into (between the outer and inner layers) the fabric formwork. Continue the concrete filling to the full length of the fabric formwork pipeline cover or a designated distance toward the next, in line, filling port and continue the sequence until filling the full length of the fabric formwork pipeline cover. When concrete rises from the venting port start pumping and close the venting port. In an alternate embodiment, the pump hose inserts through a partially closed side 16, 18 for filling the cavity.

During concrete filling of the concrete pipeline cover fabric formwork the outside layer of fabric formwork will be move radially outward from the inner layer of the fabric formwork a distance equal to the specified thickness of the concrete cover. The thickness is regulated by the length of the opposing cords that define interior linkages between the layers 12, 14. As the outside layer of the fabric formwork moves radially outward, the crisscrossed thickness control warp cords 30 open to form an X shape (of the crossing warp cords 30) with the intersection of the legs of the X (i.e., the crossing support 34) nominally at half of the X's height, or nominally half of the thickness of the resulting hardened shell of concrete 46 upon curing of the cementitious flowable material that fills the cavity of the formwork.

As the X defined by the opposing interior linkages or cords 30 opens while the cementitious material fills the space between the opposing layers 12, 14, the weft reinforcement cables or flexible wire lifts along the outer "V" section of the X to a nominal height of half the specified thickness of the concrete cover and the circumferential warp cables or flexible wires will hold (contain) the weft cable or flexible wires at the designated center of the concrete pipeline cover. The crossing support 34 supports the cable thereat.

The cementitious material filled in situ into the formwork envelope cures to form a reinforced circumferential surround of the hardened fabric cover shell or enclosure surround around the pipe for resisting damage to the pipe from ambient environment conditions such as rock falls, landslides, or weather events for the portions of the pipeline at above ground exposed areas such as ravines or waterway crossings.

It thus is seen that the foregoing describes a reinforced concrete protective cover for forming an in situ circumferential surround of for protecting pipelines from damages from rock falls and landslides. Although the reinforced concrete protective cover has been illustrated and described in its preferred form, it should be understood that many modifications, additions and deletions may be made to that specific form without departure from the scope of the invention as set forth in the claims.

What is claimed is:

1. A formwork for a circumferential jacketing surround of a pipe, comprising:
   an envelope having opposing top and bottom layers interconnected by opposing end panels and opposing first and second side edges defining open ends that are configured with opposing mating connectors for joining the first side and the second side edges together;
   the formwork for wrapping circumferentially around a pipe, whereby the opposing first and second side edges connect together with the mating connectors and a fluidal curable material received into the envelope for curing the formwork as a circumferential jacketing surround of the pipeline; and
   a plurality of a set of interior linkages between the top layer and the bottom layer, for holding the top and bottom layer in spaced-apart relation upon filling the envelope with the fluidal curable material.

2. The formwork as recited in claim 1, wherein said linkages in each set cross medial the top layer and the bottom layer as a crossing support; and further comprising a plurality of circumferential cables extending between the crossing support and the opposing top layer of the envelope from the opposing first side edge to the second side edge sides, the formwork further comprising a plurality of cable clamps, each for securing opposing ends of a respective one of the circumferential cables prior to joining the first and second side edges, or a plurality of longitudinal cables extending between the circumferential cables and the top layer between the opposing first and second sides.

3. The formwork as recited in claim 2, further comprising a plurality of pull cords extending through the envelope between the opposing sides, said pull cords for attaching at one end to a respective cable and removed by pulling thereof from the opposing side for installing said respective cable between, wherein said respective cable comprises one of said circumferential cables.

4. The formwork as recited in claim 1, wherein said opposing top and bottom layers of said envelope each formed of a woven sheet, wherein each of said interior linkages in each of the plurality of sets of interior linkages are a pair of interwoven cords, and wherein each said pair of cords are interwoven in spaced-apart relation in the woven sheet or said pair of cords are spaced at least one dent of a fabric weaving loom.

5. The formwork as recited in claim 1, wherein said opposing ends formed of fabric sheets.

6. The formwork as recited in claim 1, wherein said mating connectors comprises a slide fastener.

7. The formwork as recited in claim 1, wherein said mating connector comprises elongated strips of hook-and-loop fabric fasteners.

8. The formwork as recited in claim 1, further comprising a fill port in the envelope for receiving fluidal curable material into the envelope.

9. A formwork for a circumferential jacketing surround of a pipe, comprising:
   an envelope having opposing top and bottom layers interconnected by opposing end panels and opposing first and second side edges defining open ends that are configured with opposing mating connectors for joining the first side and the second side edges together;
   a plurality of a set of interior linkages between the top layer and the bottom layer, said linkages in each set crossing medial the top layer and the bottom layer as a crossing support;
   a plurality of circumferential cables extending between the crossing support and the opposing top layer of the envelope from the opposing first side edge to the second side edge sides;
   a plurality of cable clamps, each for securing opposing ends of a respective one of the circumferential cables; and
   a plurality of longitudinal cables extending between the circumferential cables and the top layer between the opposing first and second sides,
   the formwork for wrapping circumferentially around a pipe, whereby the opposing ends of each respective one of the circumferential cables being clamped together and the opposing first and second side edges connect together with the mating connectors, with a fluidal curable material received into the envelope for curing the formwork as a circumferential jacketing surround of the pipeline.

10. The formwork as recited in claim 9, wherein said opposing top and bottom layers of said envelope each formed of a woven sheet, and wherein the each of said interior linkages in each of the plurality of sets of interior linkages are a pair of interwoven cords.

11. The formwork as recited in claim 10, wherein each said pair of cords are interwoven in spaced-apart relation in the woven sheet or wherein said pair of cords are spaced at least one dent of a fabric weaving loom.

12. The formwork as recited in claim 9, wherein said opposing ends formed of fabric sheets; or wherein said mating connectors comprises a slide fastener; or wherein said mating connector comprises elongated strips of hook-and-loop fabric fasteners; or the formwork further comprises a plurality of pull cords extending through the envelope between the opposing sides, said pull cords for attaching at one end to a respective cable and removed by pulling thereof from the opposing side for installing said respective cable between; or the formwork further comprises a fill port in the envelope for receiving fluidal curable material into the envelope.

13. A method for jacketing a pipeline with a circumferential surround, comprising the steps of:
   (a) wrapping an envelope around a section of a pipe, said envelope having opposing top and bottom layers interconnected by opposing end panels and opposing first and second side edges that are configured with opposing mating connectors for joining the first side and the second side together;
   (b) joining the first and second side edges; and
   (c) filling an interior cavity of the envelope with a curable fluidable material, whereby the envelope wrapped circumferentially around a pipe and closed by connecting together the opposing first and second side edges with the mating connectors, being filled with the fluidal curable material received into the envelope for curing as a circumferential jacketing surround of the pipeline,
   the envelope having a plurality of a set of interior linkages between the top layer and the bottom layer, for holding the top and bottom layer in spaced-apart relation upon filling the envelope with the fluidal curable material.

14. The method of jacketing as recited in claim 13, further comprising the step of defining a plurality of a series of spaced-apart crossing supports medial the opposing top and bottom layers, each one of said series of spaced-apart crossing supports between the opposing end panels and said plurality of said series spaced-apart between the first and second side edges.

15. The method of jacketing as recited in claim 14, further comprising the step of positioning in a respective one series of the plurality of series of crossing supports a respective one of a plurality of circumferential cables between the crossing support and the top layer, the method further comprising the step of connecting opposing ends of each respective one of the circumferential cables with a respective one of a plurality of cable clamps before joining the first and second side edges, and/or the method further comprising the step of positioning a plurality of longitudinal cables extending transverse to the circumferential cables between opposing end panels.

16. The method of jacketing as recited in claim 14, further comprising the step of positioning a plurality of a set of interior linkages between the top layer and the bottom layer, said interior linkages defining the crossing supports by crossing medial the top layer and the bottom layer; and wherein the top and bottom layers are woven fabric sheets and further comprising interweaving the plurality of sets of interior linkages with at least a first cord and a second cord woven in alternating respective opposing top sheet and bottom sheet for a respective predetermined length, whereby said interior linkage comprises a portion of the cord transition between the top and bottom layer and said respective portions defining the crossing support.

17. The method of jacketing as recited in claim 13, wherein the curable fluidable material fills the envelope through a fill port.

18. A method of forming a jacketing surround for a pipeline, comprising the steps of:
   (a) weaving a formwork envelope having opposing top and bottom layers and including interweaving of:
      a plurality of sets of interior linkages, each set having at least a first cord and a second cord woven in alternating respective opposing top sheet and bottom sheet for a respective predetermined length, whereby said interior linkage comprises a portion of the cord transition between the top and bottom layer and said respective portions defining a respective one of a plurality of crossing supports;
      a plurality of spaced-apart longitudinal pull cords in said to sheet; and
      a plurality of spaced-apart transverse pull cords in said top sheet;
   (b) attaching opposing mating connectors to opposing first and second side edges for joining the first side and the second side together;
   (c) attaching each respective longitudinal pull cord to a circumferential cable;
   (d) pulling each respective longitudinal pull cord from the envelope to position the circumferential cable between the crossing supports and the top layer;
   (e) attaching each respective transverse pull cord to a longitudinal cable; and
   (f) pulling each respective transverse pull cord from the envelope to position the longitudinal cable between the respective circumferential cable and the top layer,
   whereby the formwork envelope being wrapped circumferentially around a pipe, the opposing ends of each respective one of the circumferential cables clamped together, and the opposing first and second side edges connected together with the mating connectors, filling the formwork envelope with a fluidal curable material for curing the formwork envelope as a circumferential jacketing surround of the pipeline.

\* \* \* \* \*